UNITED STATES PATENT OFFICE.

FRANK A. JOHNSON, OF SALISBURY, MASSACHUSETTS.

FOOD PRODUCT.

1,054,422.  Specification of Letters Patent.  Patented Feb. 25, 1913.

No Drawing. Application filed February 17, 1908, Serial No. 416,382. Renewed January 13, 1913. Serial No. 741,883.

*To all whom it may concern:*

Be it known that I, FRANK A. JOHNSON, a citizen of the United States, and a resident of Salisbury, in the county of Essex, Commonwealth of Massachusetts, have invented an Improvement in Food Products, of which the following is a description.

My invention relates to foods and has special reference to such articles of food as have a coating of butterine, oleomargarin, butter or one of the compounds thereof, or substitute therefor, applied to the same for the purpose of imparting thereto an improved flavor. Of all the materials heretofore used for this purpose none, so far as I am aware, gives the satisfactory results of butter. The use of butter for this purpose, however, is open to one great objection, viz., the butter, after a short time, becomes rancid, and the food, as a result unsalable. I have found that the cause of the butter becoming rancid is the presence therein of various impurities, together with casein and a large amount of moisture.

I have discovered that an article of food in the preparation of which practically chemically pure butter fat is used, will not lose its agreeable flavor and will remain sweet and pure indefinitely. This is because the butter fat possesses substantially none of the elements referred to as likely to cause fermentation.

My invention is peculiarly suited for use in the preparation of commercial articles of food intended to be packaged for indefinite keeping.

My invention may be embodied in an article of food of any convenient size and shape. In my preferred form the invention comprises a cracker composed of entire wheat flour and water, with a small quantity of sugar when desired, prepared in the usual manner by means of the mixing machine, dough press and brake, cutting machine and salting machine, after which it is put in the oven and baked in the usual manner to a golden brown color. After the cracker is removed from the oven, a coating of substantially pure butter fat is applied thereto comprising ordinarily the following elements in about the proportions specified:

| | | |
|---|---|---|
| Palmitic acid | | 38.61% |
| Oleic " | | 32.50 |
| Myritic " | | 9.89 |
| Lauric " | | 2.57 |
| Stearic " | | 1.83 |
| Butyric " | | 5.45 |
| Caproic " | | 2.09 |
| Dioxystearic acid | | 1.00 |
| Capric acid | | 0.32 |
| Caprilic " | | 0.49 |
| And glycerin present as the triglycerids of the above | | 5.25 |
| | | 100.00% |

The butter fat above referred to lacks practically all the impurities which exist in a greater or less degree in all butter and its compounds and substitutes, and thus the agents which cause fermentation and destroy the flavor of the butter are absent. A cracker provided with a coating of the above material will retain its natural flavor indefinitely, and the coating tends to prevent the cracker from becoming dry by preserving it from the usual effects of exposure to the atmosphere and serves also as a preservative.

Claim:

As an article of package food adapted for indefinite keeping, a baked cracker consisting of entire wheat flour and water, salted and having a moisture repellent and flavor retaining surface impregnant composed of pure butter oil from which all casein and other impurities have been removed.

In testimony whereof, I have signed my name to this specification, in the presence of two subscribing witnesses.

FRANK A. JOHNSON.

Witnesses:
EVERETT S. EMERY,
ANNIE E. CHESLEY.